United States Patent
Goodsitt et al.

(10) Patent No.: US 11,657,401 B2
(45) Date of Patent: May 23, 2023

(54) SYSTEMS AND METHODS FOR WARRANTY COVERAGE ALERTS BASED ON ACQUISITION DATA

(71) Applicant: Capital One Services, LLC, McLean, VA (US)

(72) Inventors: Jeremy Goodsitt, McLean, VA (US); Kate Key, Effingham, IL (US); Vincent Pham, Champaign, IL (US); Galen Rafferty, McLean, VA (US); Anh Truong, Champaign, IL (US); Mark Watson, Sedona, AZ (US); Reza Farivar, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 80 days.

(21) Appl. No.: 17/170,606

(22) Filed: Feb. 8, 2021

(65) Prior Publication Data
US 2022/0253865 A1 Aug. 11, 2022

(51) Int. Cl.
G06Q 30/00 (2012.01)
G06Q 30/012 (2023.01)

(52) U.S. Cl.
CPC .................. *G06Q 30/012* (2013.01)

(58) Field of Classification Search
None
See application file for complete search history.

(56) References Cited

U.S. PATENT DOCUMENTS

| 8,095,436 B1* | 1/2012 | Shah .................. G06Q 40/02 705/30 |
| 8,229,849 B2 | 7/2012 | Olliphant et al. |
| 8,442,844 B1* | 5/2013 | Trandal ............. G06Q 30/012 705/35 |
| 2002/0128851 A1 | 9/2002 | Chefalas et al. |
| 2002/0128933 A1* | 9/2002 | Day .................. G06Q 30/0633 705/26.8 |

(Continued)

FOREIGN PATENT DOCUMENTS

| CN | 102171984 A | * | 8/2011 | ......... H04L 63/0815 |
| CN | 107730283 A | * | 2/2018 | ........... G06F 16/252 |
| WO | WO-2011141066 A1 | * | 11/2011 | ............. H04L 12/22 |

OTHER PUBLICATIONS

T. Tahmassebi, "An Approach to Management . . . Under Information Uncertainty", 1998, Computers Chem. Eng, vol. 22, Supp., pp. S263-S270. (Year: 1998).*

(Continued)

*Primary Examiner* — Tan D Nguyen
(74) *Attorney, Agent, or Firm* — Bookoff McAndrews, PLLC

(57) ABSTRACT

A computer-implemented method for facilitating identification of object coverage information using prior acquisition data, that includes detecting an object acquisition, determining a grouping of the object acquisition from a plurality of groupings, and identifying a corresponding object acquisition within the same grouping as the object acquisition. The method further includes determining the corresponding object acquisition includes coverage protection, and transmitting an alert of the corresponding object acquisition and the coverage protection.

20 Claims, 3 Drawing Sheets

(56) References Cited

U.S. PATENT DOCUMENTS

| | | | | |
|---|---|---|---|---|
| 2003/0126001 | A1* | 7/2003 | Northcutt | G06Q 10/06375 |
| | | | | 705/7.15 |
| 2009/0083052 | A1* | 3/2009 | Bokor | G06Q 30/06 |
| | | | | 705/1.1 |
| 2011/0131135 | A1 | 6/2011 | Carlson et al. | |
| 2012/0130778 | A1* | 5/2012 | Cotton | G06F 16/252 |
| | | | | 705/14.1 |
| 2014/0081667 | A1* | 3/2014 | Joao | G16H 40/63 |
| | | | | 705/3 |
| 2017/0031963 | A1* | 2/2017 | Merz | G06Q 20/08 |
| 2017/0186017 | A1 | 6/2017 | High et al. | |
| 2018/0093814 | A1* | 4/2018 | Espinosa | A23L 3/28 |
| 2018/0240124 | A1* | 8/2018 | Natarajan | G06Q 30/014 |
| 2022/0005051 | A1* | 1/2022 | Miller | G06F 16/245 |

OTHER PUBLICATIONS

Nicolas Viennot, "A Measurement Study of Google Play", 2014, SIGMETRICS'14, Jun. 16-20, 2014, pp. 1-13. (Year: 2014).*
Sina Sajadmanesh, "NP-GLM: A Non-Parametric Method for Temporal Link Prediction", 2017, Dept. of Computer Engineering, p. 1-7. (Year: 2017).*
T. Tahmassebi, "An approach to Management of Multilevel Distribution . . . under information uncertainty", 1998, Computers Chem. Engr, vol. 22, Suppl., pp. S263-270. (Year: 1998).*
Divya Saxena, "D-GAN: Deep Generative Adversarial Nets for Spatio-Temporal Prediction", 2020, IEEE, pp. 1-8. (Year: 2020).*

\* cited by examiner

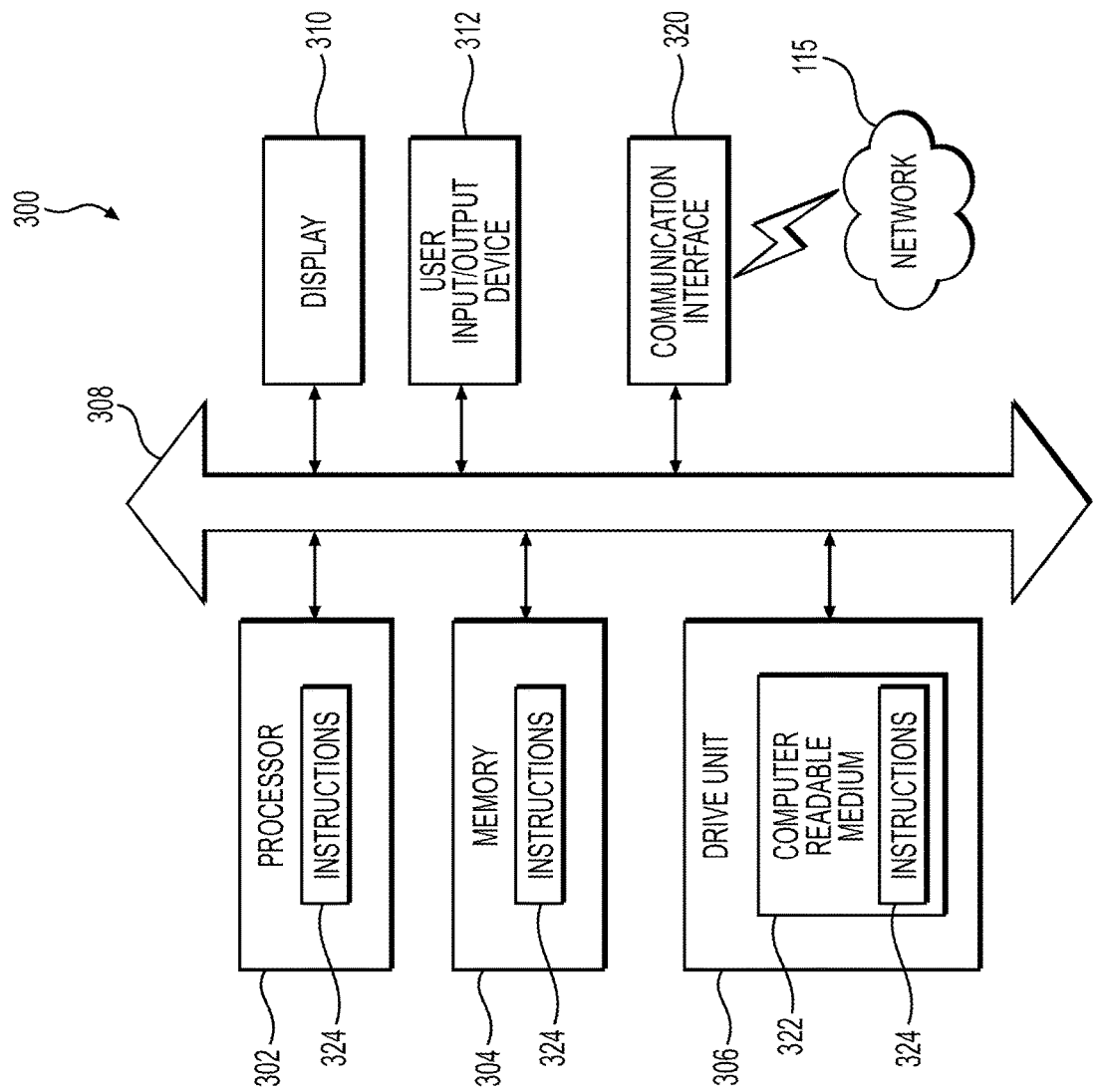

SYSTEMS AND METHODS FOR WARRANTY COVERAGE ALERTS BASED ON ACQUISITION DATA

TECHNICAL FIELD

Various embodiments of the present disclosure relate generally to a system for facilitating identification of object coverage information, and relate particularly to methods and systems for generating alerts of the existence of coverage protection for an object acquisition based on prior acquisition data of a user.

BACKGROUND

Acquisitions (e.g., purchases) of certain products by consumers may be associated with, or accompanied by, a warranty plan that provides certain protections to the consumer. For example, a warranty play may afford a reimbursement benefit to the consumer from enduring financial costs in certain circumstances, such as from a loss or damage to the acquired product. However, despite having access to such protection benefits, a consumer may disregard, fail to recall, or lack knowledge of the existence of the warranty plan covering the product. Accordingly, the consumer may relinquish the benefits afforded by the warranty plan when conducting subsequent transactions to acquire a replacement for the product and/or expenditures to repair the product.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for generating alerts of applicable coverage protection for an acquired object (e.g., a product). Each of the examples disclosed herein may include one or more of the features described in connection with any of the other disclosed examples.

In one example, a computer-implemented method for facilitating identification of object coverage information using prior acquisition data, comprising: detecting an object acquisition; determining a grouping of the object acquisition from a plurality of groupings; identifying a corresponding object acquisition within the same grouping as the object acquisition; determining the corresponding object acquisition includes coverage protection; and transmitting an alert of the corresponding object acquisition and the coverage protection.

In another example, a computer-implemented method for automating product coverage identification, comprising: determining an occurrence of an object acquisition; categorizing the object acquisition to at least one category of a plurality of categories based on a characteristic of the object acquisition; determining a prior product acquisition included within the at least one category has a corresponding characteristic similar to the characteristic of the object acquisition; determining the prior object acquisition includes a coverage plan; and generating a notification including the prior object acquisition and the coverage plan.

In a further example, a system may include a processor, and a memory storing instructions that, when executed by the processor, causes the processor to perform operations including: receiving data indicative of an object acquisition; determining at least one grouping of the object acquisition from a plurality of groupings; identifying a matching object acquisition in the same grouping of the object acquisition from prior object acquisition data; determining the matching object acquisition includes object coverage protection; and transmitting an alert to a user device of the matching object acquisition and the object coverage protection.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts an example of a computing device, according to aspects of the present disclosure.

DETAILED DESCRIPTION OF EMBODIMENTS

Figure 1:
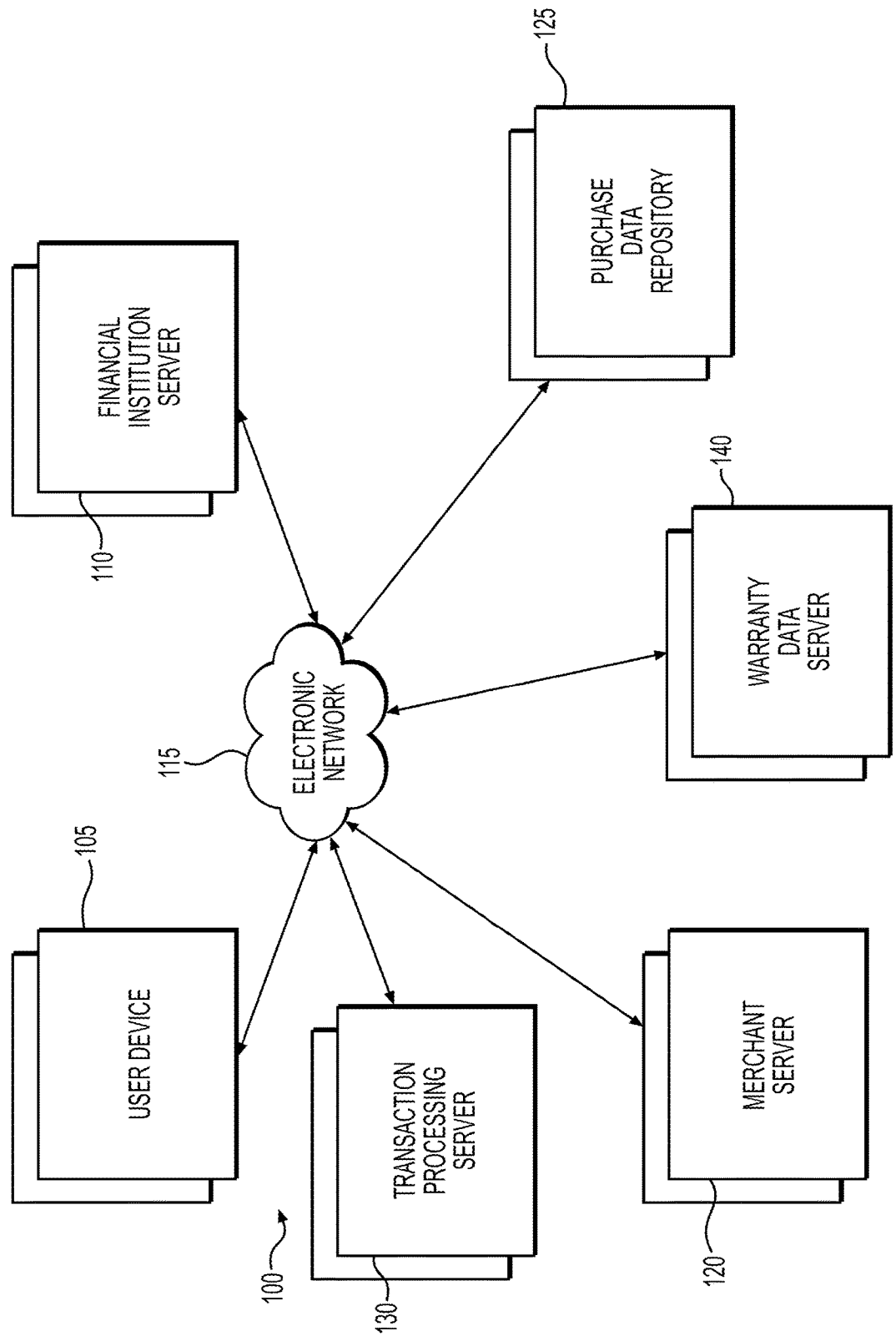
FIG. 1 depicts an exemplary client-server environment that may be utilized according to aspects of the present disclosure.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In general, the present disclosure provides methods and systems for generating and transmitting object coverage information to a user device based on detecting an object (e.g., a good, a service, etc.) acquisition and identifying a corresponding object acquisition from prior acquisition data that includes coverage protection. An alert may be transmitted with the corresponding object acquisition information and coverage protection to allow a user to identify and utilize the protections afforded by the coverage plan. As will be discussed in greater detail herein, existing techniques may be improved with the methods and systems of the present disclosure.

In some instances, information relating to the availability of coverage protection may be unknown to the user when initially acquiring an object, such as when such warranty is provided by the manufacturer of the object or the financial service provider that processed an acquisition of the object. Users seeking to minimize instances of foregoing coverage benefits afforded by warranty protection plans for previously-acquired objects (e.g., products or services) may require proactive assistance in identifying the existence of such coverage and the applicability of protection benefits provided by said plan. Accordingly, a need exists to provide a real-time ability to generate and transmit alerts to a user with coverage protection information when conducting object acquisitions based on prior acquisition data.

FIG. 1 depicts an exemplary client-server environment that may be utilized with techniques presented herein. For example, the environment may include a system 100 with one or more user devices 105, one or more financial institution servers 110, one or more merchant servers 120, a purchase data repository 125, and one or more warranty data servers 140. System 100 may further include a transaction processing server 130. The one or more components of system 100 may communicate with one another across an electronic network 115, and in any arrangement.

It should be appreciated that system 100 may include a plurality of users, each of which may include or otherwise be associated with at least one user device 105. User device 105 may include various suitable apparatuses, including but not limited to, a mobile device, a computer, a wearable device (e.g., a smartwatch) and the like. User device 105 may be configured to transmit and receive signals between one or more components of system 100, the signals being indicative of a data or messages relating to an object acquisition (e.g., transaction, purchase, etc.). One or more user devices 105 may include a third-party software installed thereon for receiving signals from other components of system 100. The third-party software may include, but is not limited to, an electronic application (e.g., a mobile internet application, a text messaging application, an e-commerce application, a social media application, or the like), an internet browser extension, or a website page. The third-party software on user device 105 may include programmable instructions that cause user device 105 to communicate with the one or more components of system 100.

The user may be a customer of one or more financial institutions and may have one or more consumer accounts with said financial institution(s). In this instance, the one or more consumer accounts may be stored on (or otherwise associated with) financial institution server 110. The user may conduct one or more transactions with the consumer account(s), such as, for example, purchasing a product, a good, or a service (collectively referred to herein as "object") from one or more merchants, retailers, and the like. Financial institution server 110 may include or be in communication with a purchase data repository 125 for storing historical financial data, such as, for example, acquisition (purchase) data. In the example, financial institution server 110 is depicted as a separate component from purchase data repository 125, however, in other embodiments, the financial data may be stored on financial institution server 110.

Still referring to FIG. 1, merchant server 120 may be configured to generate acquisition data indicative of an object acquisition (e.g., purchase) made with the consumer account. In some embodiments, the consumer account may be communicatively coupled to a consumer card (e.g., credit card, debit card, etc.), a mobile payment application (e.g., on user device 105), and the like. Accordingly, completing a purchase may generate the acquisition data thereby indicating an occurrence of an object acquisition (e.g., transaction). In some embodiments, the acquisition data may include various information relating to the transaction.

For example, the acquisition data may include one or more purchase characteristics (e.g., data fields) relating to the transaction. The one or more purchase characteristics may include, but are not limited to, a product (e.g., good, service, etc.) name, a merchant name, a transaction date, a transaction time, a transaction identification number, a transaction amount, a merchant identification number, a merchant category code, a product description, a transaction description, an image, and more. Merchant server 120 may be configured to communicate the acquisition data to financial institution server 110 and/or purchase data repository 125.

In some embodiments, a user may generate acquisition data relating to the transaction via user device 105. For example, a user may be prompted by transaction processing server 130 to provide information relating to the object acquisition at a time of the transaction. In one example, a user may transmit a picture of the acquired object, a receipt documenting details of the purchase, etc., taken from user device 105 or another device in communication with user device 105. In other embodiments, user device 105 may automatically generate acquisition data relating to the transaction, such as, for example, in the form of meta data. The meta data may include information defining a location of the user at the time of purchase, an identification of the user, and more. Purchase data repository 125 may store the acquisition data generated by merchant server 120 and/or user device 105, and associate the data with the consumer account of the user.

The object acquisitions conducted by a user for various goods or services may be associated with one or more warranty coverage plans. The warranty coverage plan may provide protection benefits to the user as the owner of the acquired object, with said protection benefits being initiated in response to the acquisition of the object by the user from the merchant. In some examples, the warranty coverage plan may be provided to the user by the financial institution associated with the consumer account utilized by the user to conduct the object acquisition. In other examples, the warranty coverage plan may be provided by a manufacturer of the object or the merchant from which the object was acquired. It should be understood that the warranty coverage plan may be automatically provided to the user by virtue of the acquisition, or acquired (e.g., purchased) by the user separately from the object.

Warranty data server 140 may store coverage information relating to the warranty coverage plan and the corresponding acquired object associated with the warranty coverage plan. It should be appreciated that system 100 may include, or be in communication with, a plurality of warranty data servers 140 across electronic network 115. For example, system 100 may include a plurality of warranty data servers 140 from multiple product manufacturers, payment service providers, retail service providers, web platform providers, and more.

Transaction processing server 130 may be configured to detect an occurrence of an object acquisition in response to receiving data corresponding to the object acquisition from one or more components of system 100. For example, transaction processing server 130 may receive acquisition data from financial institution server 110 and/or merchant server 120. Transaction processing server 130 may be further configured to obtain prior object acquisition data from financial institution server 110 and/or purchase data repository 125, and warranty coverage plan information associated with the object acquisition or prior object acquisitions from warranty data server 140. As described in further detail herein, transaction processing server 130 may be configured to train a machine learning model to determine that a detected object acquisition serves as a replacement for a prior object acquisition conducted by a user, and that the warranty coverage plan from the prior object acquisition provides protection benefits to the user.

As used herein, a "machine learning model" may include data (e.g., acquisition data, warranty data, etc.) or instruction(s) for generating, retrieving, and/or analyzing such data. Further, as used herein, a "machine learning model" is a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Still referring to FIG. 1, one or more of user device 105, financial institution server 110, merchant server 120, purchase data repository 125, warranty data server 140, and/or transaction processing server 130 may communicate with each other over the electronic network 115 in executing the machine learning model to determine an object acquisition is a replacement for a prior objection acquisition. Electronic network 115 may include a telecommunications network such that one or more of user device 105, financial institution server 110, merchant server 120, purchase data repository 125, warranty data server 140, and/or transaction processing server 130 may communicate with one another over the telecommunications network. The telecommunications network may include, for example, a telephone network, a cellular network, and the like. In other embodiments, electronic network 115 may be a public switched telephone network (PTSN), a voiceover Internet Protocol (VoIP) network, a wide area network ("WAN"), a local area network ("LAN"), personal area network ("PAN"), or the like.

While FIG. 1 depicts the various components of system 100 as physically separate and communicating across network 115, it should be appreciated that in other embodiments one or more components of system 100 may be incorporated partially or completely into any of the other components shown in FIG. 1. Some or all of the functionality of the machine learning model may be incorporated into one or more components of system 100, such as, for example, transaction processing server 130. Some or all of the functionality of transaction processing server 130 may be accessible via user device 105 and incorporated into a mobile internet application, an internet browser extension, or website page.

In some embodiments, one or more components of system 100 (e.g., transaction processing server 130) may be configured to train a machine learning model to execute one or more processes, such as, for example, process 200 shown and described herein. As described in further detail below, transaction processing server 130 may be further configured to train the machine learning model to predict one or more variables in addition to executing the exemplary process 200. The one or more variables may include a relationship between one or more prior object acquisitions and a recent object acquisition, and more.

Multiple approaches may be used when predicting the relationship between prior object acquisitions and recent objection acquisitions. The machine learning model trained by transaction processing server 130 may include an automatable, adaptable tool that may provide accurate predictions as to the relationship. In some embodiments, the model trained by transaction processing server 130 may include using a "base" or standard machine learning algorithm or technique, and adapting it based on the acquisition data and/or warranty data received from the one or more components of system 100. In such embodiments, a model including a base machine learning algorithm or technique configured to provide predictions may be trained by transaction processing server 130. It should be appreciated that transaction processing server 130 may be one or more hardware and/or software components that are configured to sort and analyze the data shown and described herein, generate, train, and/or modify the machine learning model, predict a relationship between object acquisitions, and determine a recent acquisition serves as a replacement of a prior acquisition using the trained machine learning models.

In some embodiments, transaction processing server 130 may include a plurality of computing devices working in concert to perform data analyses and to determine the replacement evaluation. Such computing devices may be any suitable computing devices, now-known or later-developed, capable of performing aspects of the processes and methods described herein. Transaction processing server 130 may be located in a single geographic area or multiple geographic areas, and may be connected to one another via, e.g., wired or wireless components (e.g., network 115). System 100 may be programmed in various suitable formats, such as, for example, on a platform of a financial institution service provider, a web browser extension, a mobile device application, a payment service provider, and more.

Figure 2:
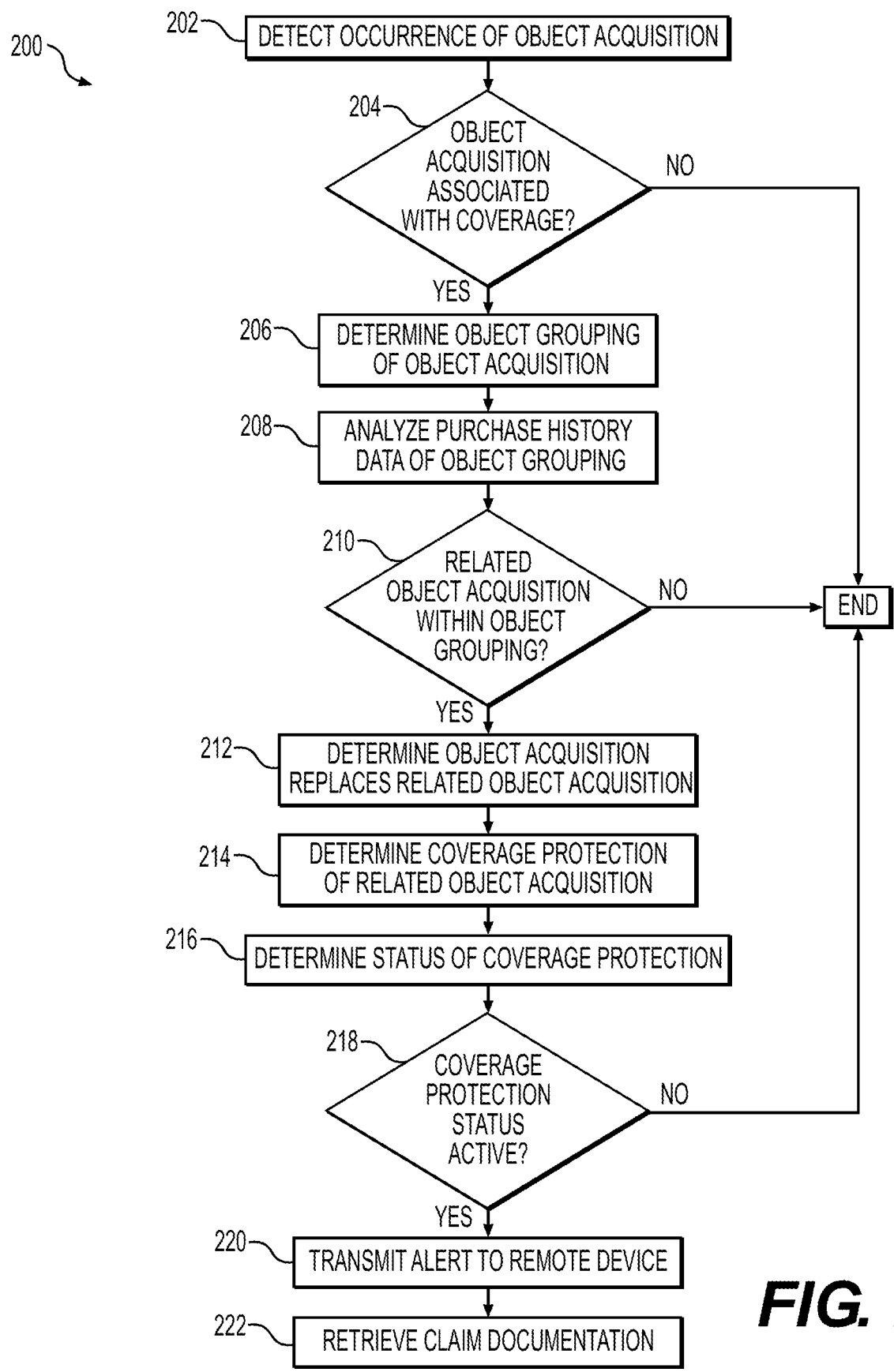
FIG. 2 depicts an exemplary process for transmitting object coverage information to a user device.

FIG. 2 illustrates an exemplary process 200 for generating an alert with coverage information of a previously-acquired object based on determining the acquisition of a replacement in accordance with embodiments of the present disclosure. It should be understood that the steps described herein, and the sequence in which they are presented, are merely illustrative such that additional and/or fewer steps may be included without departing from the scope of the present disclosure.

Initially, at step 202, financial institution server 110 (and/or transaction processing server 130) may detect an object acquisition, e.g., an occurrence of a transaction conducted with a consumer account (hereinafter referred to as "present object acquisition"). For example, a transaction may be detected by transaction processing server 130 in response to receiving acquisition data indicative of a purchase made with the consumer account, such as from merchant server 120. In some embodiments, the consumer account may be communicatively coupled to a consumer card (e.g., credit card, debit card, etc.), a mobile payment application (e.g., on user device 105), and the like. Accordingly, completing a purchase may generate the acquisition data thereby indicating an occurrence of the transaction. In some embodiments, the acquisition data may include various information relating to the transaction.

For example, the acquisition data may include one or more purchase characteristics (e.g., data fields) relating to the transaction. The one or more purchase characteristics may include, but are not limited to, a product (e.g., good, service, etc.) name, a merchant name, a transaction date, a transaction time, a transaction identification number, a transaction amount, a merchant identification number, a merchant category code, a product description, a transaction description, an image, and more.

At step 204, transaction processing server 130 may be configured to determine whether the object acquired in the transaction (step 202) is associated with coverage protection. For example, transaction processing server 130 may analyze the acquisition data to determine whether the one or more purchase characteristics correspond to objects that routinely include a warranty plan. Transaction processing server 130 may communicate with financial institution server 110 and/or warranty data server 140 to retrieve acquisition data of previous object acquisitions conducted by the user and/or a plurality of other users. In this instance, the acquisition data of the transaction detected at step 202 may be compared to the historical acquisition data of the plurality of prior acquisitions to determine whether the present object acquisition (step 202) is for an object routinely associated with coverage protection.

By way of illustrative example only, the object acquired at step 202 may include perishable food such that the purchase characteristics of the acquisition data relating to the transaction may identify the product as such. In this instance, a merchant name associated with the object acquisition may identify a grocery store at which the perishable food was purchased. A merchant identification number associated with the grocery store from which the object was acquired, and/or a merchant category code classifying the type of business of which the merchant is a part of, may be indicative of a store primarily engaged in retailing food products. A product and/or a transaction description may further define the type of good to which the object acquisition relates. A transaction amount associated with the object acquisition may fall within one of a plurality of predefined threshold ranges (e.g., about $1.00 to $100.00, about $101.00 to $200.00, about $201.00 to $500.00, and more), such as about $1.00 to $100.00. It should be appreciated each of the purchase characteristics may be indicative of the object (e.g., good or service) acquired by the user at step 202, and may serve as a parameter for transaction processing server 130 determining whether the object acquisition is associated with coverage protection.

Transaction processing server 130 may be configured to analyze historical acquisition data from financial institution server 110 to identify one or more prior object acquisitions having similar purchase characteristics as the object acquisition at step 202. Transaction processing server 130 may cross-reference the prior object acquisitions having similar purchase characteristics with warranty data server 140 to determine whether the prior object acquisitions included a warranty plan. Transaction processing server 130 may assess whether the present object acquisition may be associated with coverage protection based on determining whether a majority percentage (e.g., 51% or more) of the prior object acquisitions having similar purchase characteristics included a warranty plan. In this instance, transaction processing server 130 may determine that prior object acquisitions for perishable food products did not routinely include warranty plans, such that the object acquisition at step 202 is not associated with coverage protection benefits. In response to transaction processing server 130 determining the object acquisition of step 202 is not associated with coverage protection at step 204, system 100 may end the process 200.

By way of another illustrative example, the object acquired at step 202 may include electronic equipment such that the purchase characteristics of the acquisition data relating to the transaction may identify the product as such. In this instance, a merchant name associated with the object acquisition may identify a consumer electronics retailer at which the electronic equipment was purchased. A merchant identification number associated with the consumer electronics retailer from which the object was acquired, and/or a merchant category code classifying the type of business of which the merchant is a part of, may be indicative of a store primarily engaged in retailing electronic appliances. A product and/or a transaction description may further define the type of good to which the object acquisition relates. A transaction amount associated with the object acquisition may fall within one of a plurality of predefined threshold ranges (e.g., about $1.00 to $100.00, about $101.00 to $200.00, about $201.00 to $500.00, and more), such as about $201.00 to $500.00.

Transaction processing server 130 may analyze historical acquisition data from financial institution server 110 to identify prior object acquisitions having similar purchase characteristics, and cross-reference the prior object acquisitions with warranty data server 140 to assess whether the present object acquisition may be associated with coverage protection. In this instance, transaction processing server 130 may determine that prior object acquisitions for electronic equipment products did routinely include warranty plans, such that the object acquisition at step 202 is associated with coverage protection benefits. In response to transaction processing server 130 determining the object acquisition of step 202 is associated with coverage protection at step 204, transaction processing server 130 may proceed to step 206.

Still referring to FIG. 2, and at step 206, transaction processing server 130 may be configured to determine an object grouping of the object acquisition detected at step 202 from one of a plurality of object groupings. Each of the plurality of object groupings may include data indicative of a plurality of prior object acquisitions conducted by the user performing the object acquisition at step 202. In some embodiments, the plurality of object groupings and the corresponding data for each of the plurality of prior object acquisitions categorized within each of the object groupings may be stored in purchase data repository 125.

Transaction processing server 130 may compare the purchase characteristics of the present object acquisition with purchase characteristics of the prior object acquisitions to determine the particular object grouping that the present object acquisition belongs in. For example, transaction processing server 130 may determine that the object grouping having prior object acquisitions with substantially similar purchase characteristics as the present object acquisition is the object grouping of the present object acquisition. It should be appreciated that prior object acquisitions may be clustered together into similar object groupings based on the type of products that were previously acquired (e.g., cameras, computers, cellular devices, vehicles, audible systems, houseware, kitchenware, furniture, etc.).

At step 208, transaction processing server 130 may be configured to analyze the purchase history data (e.g., the plurality of prior object acquisitions) categorized within the particular object grouping of the present object acquisition. At step 210, transaction processing server 130 may be configured to identify a matching object acquisition within the object grouping that relates to the present object acquisition. Stated differently, transaction processing server 130 may search the purchase history data within the object grouping (step 208) to identity a prior object acquisition conducted by the user for a similar product as that acquired by the user in the present object acquisition (step 202). It should be appreciated that transaction processing server 130 may determine that a product from a prior object acquisition is similar to that acquired in the present object acquisition from a comparison of the respective purchase characteristics of each to one another.

A product from a prior object acquisition may be similar to one acquired in the present object acquisition when one or more of a product name, a merchant name, an acquisition amount, a product description, a transaction description, or more are alike. In some instances, transaction processing server 130 may determine that a product is the same despite being different versions, acquired from different merchants, produced by different manufacturers, having different acquisition amounts, and more. Accordingly, it should be appreciated that a prior object acquisition conducted by the user may be determined to be related to the present object acquisition despite including varying purchase characteristics.

In response to determining the object grouping does not include at least one prior object acquisition that relates to the present object acquisition, transaction processing server 130 may be configured to end the process 200. Alternatively, in response to determining the object grouping does include at least one prior object acquisition that relates to the present object acquisition, transaction processing server 130 may be configured to, at step 212, determine whether the object acquired via the present object acquisition is a replacement for the prior object acquired via the prior object acquisition. In some embodiments, transaction processing server 130 may generate a verification message for transmission to user device 105 (e.g., via electronic network 115) soliciting the user's confirmatory feedback on whether the present object acquisition serves to replace a product from the prior object acquisition. In this instance, user device 105 may transmit an input (e.g., an affirmative or negative response) to transaction processing server 130 responsive to the inquiry.

In other embodiments, transaction processing server 130 may determine whether the present object acquisition replaces a prior object using the trained machine learning model. As described in detail above, transaction processing server 130 may be configured to train the machine learning model to determine whether an object acquisition is a replacement of a prior object acquisition based on one or more of the acquisition data stored in purchase data repository 125 and the warranty data on warranty data server 140. In one example, transaction processing server 130 trains the machine learning model to categorize or disregard future object acquisitions as replacements of prior object acquisitions based on a frequency of the transactions relative to one another. For example, transaction processing server 130 may determine that the user routinely acquires objects having similar purchase characteristics as prior object acquisitions, such that the machine learning model may be trained to determine the future object acquisitions do not serve as replacements given a regularity of the repetitive acquisitions.

In another example, transaction processing server 130 trains the machine learning model to categorize or disregard future object acquisitions as replacements of prior object acquisitions based on a frequency of warranty claims submitted in connection with the object acquisitions. For example, transaction processing server 130 may determine that the user consistently files a warranty claim for prior object acquisitions having similar purchase characteristics to a recent object acquisition, such that the machine learning model may be trained to determine the recent object acquisitions do serve as replacements given a regularity of the warranty claims submitted by the user. It should be appreciated that transaction processing server 130 may train the machine learning model based on acquisition data (e.g., from purchase data repository 125) and/or warranty data (e.g., from warranty data server 140) of the user, or a plurality of users.

Still referring to FIG. 2, and in response to determining the present object acquisition replaces at least one prior object acquisition at step 212, transaction processing server 130 may be configured to determine the coverage information corresponding to the prior object acquisition at step 214. In other words, transaction processing server 130 may determine the existence of a warranty plan associated with the prior object acquisition, and belonging to the user, by communication with at least one (e.g., a plurality) warranty data server 140. In this instance, transaction processing server 130 may determine at least one warranty data server 140 provides coverage protection for the prior object acquisition.

At step 216, transaction processing server 130 may determine a validity and/or status of the coverage protection provided by the warranty plan for the prior object acquisition that relates to the present object acquisition. In response to determining the status of the coverage protection is inactive and/or expired at step 218, transaction processing server 130 may be configured to end the process 200. Alternatively, transaction processing server 130 may transmit an alert to user device 105 notifying the user of the existence of the prior object acquisition and the expired coverage protection.

In response to determining the status of the coverage protection of the prior object acquisition is active at step 218, transaction processing server 130 may be configured to generate an alert for transmission to user device 105 at step 220. The alert may include an identification of the prior object acquisition that corresponds to the present object acquisition, along with details relating to the coverage protection provided by the warranty plan. The alert may include a message suggesting utilization of the coverage protection provided by the warranty plan for the user to seek reimbursement of value lost from the replacement of the prior object acquisition. The alert may include contact information for a provider of the warranty plan for the user's use, thereby facilitating use of the existing protection. The contact information may include a web link directing the user to complete claim documentation necessary for submitting a warranty claim with the coverage provider. The alert may further include supplemental data for use by the user, such as statistical information relating to a percentage of success for receiving compensation from the coverage provider for similar warranty claims by other users. Transaction processing server 130 may transmit the alert to user device 105 via electronic network 115.

At step 222, transaction processing server 130 may be configured to retrieve claim documentation from a provider of the warranty plan covering the prior object acquisition. For example, transaction processing server 130 may retrieve the corresponding claim documentation from warranty data server 140 and transmit the documentation to user device 105. In some embodiments, transaction processing server 130 may be configured to autocomplete the claim documentation based on information relating to the prior object acquisition (e.g., acquisition data), the user, the coverage protection (e.g., warranty data), and more. In this instance, transaction processing server 130 may transmit the completed claim documentation to user device 105 for review and acceptance prior to submitting the claim documentation to the provider of the warranty plan. In other instances, transaction processing server 130 may automatically submit the completed claim documentation to the provider and provide the user a notification of the submission at user device 105.

Transaction processing server 130 may be further configured to determine whether the present object acquisition (step 202) includes coverage protection from a new warranty plan. Transaction processing server 130 may supplement purchase data repository 125 with acquisition data indicative of the present object acquisition for categorizing the present object acquisition in a corresponding object grouping (e.g., the object grouping identified at step 206). Transaction processing server 130 may further supplement warranty data server 140 with the acquisition data and/or warranty data associated with the present object acquisition.

It should be appreciated that system 100 may be configured to generate data (e.g., coverage information) for transmission to a user, wherein the data may not have been previously known to the user. In this instance, system 100 may provide the user with new information, and facilitate identification of the necessary tools to utilize said information. Such tools may include, but are not limited to, the warranty service provider's claim documentation, acquisition data of prior object acquisitions for completing the claim documentation, identity and contact information of warranty service provider, statistical information relating to a percentage of success for receiving compensation from the warranty service provider, and more. System 100 may allow for expedited processing control and speed for warranty claims between consumers and warranty service providers. System 100 may increase a volume of warranty claims submitted to warranty service providers by consumers. Further, by at least partially automating the claim submission process, system 100 may increase a percentage of warranty claims successfully submitted to warranty service providers, thereby minimizing a percentage of rejected claims for failure to comply with required formalities (e.g., procedures, submitted information, timing of claim, etc.). Additionally, system 100 may automatically determine the necessary claim submission formalities and/or procedures for each of the plurality of warranty service providers, such that a user of system 100 may not be required to commit an expenditure of time, resources, or effort.

FIG. 3 is a simplified functional block diagram of a computing device 300 that may be configured as a device for executing the methods of FIG. 2, according to exemplary embodiments of the present disclosure. Any of the devices, databases (e.g., servers), processors, etc. of system 100 discussed herein may be an assembly of the hardware of computing device 300 including, for example, user device 105, financial institution server 110, merchant server 120, purchase data repository 125, transaction processing server 130, and/or warranty data server 140, according to exemplary embodiments of the present disclosure.

Computing device 300 may include a central processing unit ("CPU") 302 that may be in the form of one or more processors configured to execute program instructions, such as those of process 200 described in detail above. In some embodiments, the processor(s) of CPU 302 includes both a CPU and a GPU. Computing device 300 may further include a storage unit 306 that may include non-volatile memory, such as, for example, a storage media (e.g., solid-state drives), ROM, HDD, SDD, etc. Examples of storage media include solid-state storage media (e.g., solid state drives and/or removable flash memory), optical storage media (e.g., optical discs), and/or magnetic storage media (e.g., hard disk drives). Storage unit 306 may store data on a computer readable medium 322. In some embodiments, computing device 300 may receive programming and data via network communications from electronic network 115, such as, for example, via a communication interface 320 configured to communicate with one or more other components of system 100.

Still referring to FIG. 3, computing device 300 may include a memory 304 that is volatile memory, such as, for example, RAM, solid-state memories, optical storage media (e.g., optical discs), magnetic storage media (e.g., hard disk drives), etc. Memory 304 may be configured for storing one or more instructions 324 for executing techniques presented herein, such as those of process 200 shown and described above. Memory 304 may further include a non-transitory computer-readable medium. Therefore, whenever a computer-implemented method is described in this disclosure, this disclosure shall also be understood as describing a non-transitory computer-readable medium storing instructions that, when executed by one or more processors (e.g., CPU 302), cause the one or more processors to perform the computer-implemented method.

In some embodiments, the one or more instructions 324 may be stored temporarily or permanently within other modules of computing device 300, such as, for example, CPU 302, computer readable medium 322, and more. Computing device 300 may include an input/output device 312 including one or more input ports and one or more output ports. Input/output device 312 may include, for example, a keyboard, a mouse, a touchscreen, etc. (i.e., input ports). Input/output device 312 may further include a monitor, a display, a printer, etc. (i.e. output ports). Computing device 300 may further include a display device 310 configured to connect with input/output device 312. The aforementioned elements of computing device 300 may be connected to one another through an internal communication bus 308, which represents one or more busses.

In other embodiments, the various system functions of process 200 shown in FIG. 2 may be implemented in a distributed fashion on a number of similar platforms to distribute the processing load on multiple computing devices 300. Alternatively, the system functions may be implemented by appropriate programming of one computer hardware platform, such as, for example, computing device 300.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer. Also, the presently disclosed embodiments may be applicable to any type of Internet protocol. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to, the process shown in FIG. 2, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for facilitating identification of object coverage information using prior acquisition data, comprising:
   detecting an acquisition of a first object by a user, the first object having one or more purchase characteristics;
   determining a first grouping from a plurality of groupings, for the first object, the first grouping based on the one or more purchase characteristics of the first object or one or more purchase characteristics of one or more other objects;
   identifying a corresponding object acquired by the user, from the first grouping, based on the one or more purchase characteristics of the first object and the corresponding object;
   determining the corresponding object includes coverage protection; and
   transmitting an alert of the corresponding object and the coverage protection.

2. The computer-implemented method of claim 1, wherein prior to determining the first grouping, the method further comprises:

determining whether the acquisition of the first object is associated with coverage protection.

3. The computer-implemented method of claim 1, wherein prior to transmitting the alert, the method further comprises:
determining a status of the coverage protection for the corresponding object, wherein the alert is transmitted when the status of the coverage protection is active.

4. The computer-implemented method of claim 1, wherein prior to transmitting the alert, the method further comprises:
transmitting a verification inquiry to a user device to confirm the acquisition of the first object is for an object that replaces a prior object acquired via the corresponding object; and
receiving an affirmative response to the verification inquiry from the user device.

5. The computer-implemented method of claim 1, further comprising:
retrieving claim submission documentation from a coverage provider and for the corresponding object; and
transmitting the claim submission documentation to a user device.

6. The computer-implemented method of claim 5, wherein prior to transmitting the claim submission documentation to the user device, the method comprises:
completing the claim submission documentation based on information relating to the corresponding object.

7. The computer-implemented method of claim 6, wherein prior to transmitting the claim submission documentation to the user device, the method comprises:
transmitting the completed claim submission documentation to the coverage provider.

8. The computer-implemented method of claim 1, wherein each of the plurality of groupings includes data indicative of a plurality of prior object acquisitions having one or more characteristics.

9. The computer-implemented method of claim 8, wherein the one or more characteristics includes a merchant name, an acquisition date, an acquisition amount, or a merchant grouping code associated with each of the plurality of prior object acquisitions.

10. The computer-implemented method of claim 8, wherein determining the first grouping from the plurality of groupings comprises:
comparing one or more characteristics of the first object to the one or more characteristics of the plurality of prior object acquisitions grouped in each of the plurality of groupings.

11. The computer-implemented method of claim 1, further comprising:
determining the object acquisition includes a new coverage protection; and
adding data indicative of the first object and the new coverage protection in at least one of the plurality of groupings.

12. The computer-implemented method of claim 11, further comprising:
adding one or more characteristics of the first object in the at least one plurality of groupings.

13. The computer-implemented method of claim 1, wherein determining the corresponding object includes coverage protection comprises:
communicating with a server of a manufacturer, a payment service provider, a retail service provider, or a web platform provider;
determining at least one of the manufacturer, the payment service provider, the retail service provider, or the web platform provider provides coverage protection for the corresponding object; and
retrieving information of the coverage protection from the server.

14. A computer-implemented method for automating product coverage identification, comprising:
determining an occurrence of an acquisition of a first object by a user;
categorizing the first object to at least one category of a plurality of categories based on flan one or more characteristics of the first object;
determining a prior product, acquired by the user, included within the at least one category, has one or more corresponding characteristics similar to the one or more characteristics of the first object;
determining the prior product includes a coverage plan; and
generating a notification including the prior product acquisition and the coverage plan.

15. The computer-implemented method of claim 14, wherein prior to generating the notification, the method further comprises:
retrieving information of the coverage plan;
determining a validity of the coverage plan for the prior object acquisition;
transmitting an inquiry to confirm the object acquisition is for replacing the prior object acquisition; and
transmitting the notification in response to receiving an affirmative response to the inquiry.

16. The computer-implemented method of claim 14, further comprising:
submitting an automatic claim for reimbursement to a coverage provider for the prior object acquisition.

17. The computer-implemented method of claim 14, wherein categorizing the object acquisition to the at least one category based on the characteristic of the object acquisition comprises:
comparing the characteristic of the object acquisition to one or more characteristics of a plurality of prior object acquisitions categorized in each of the plurality of categories.

18. The computer-implemented method of claim 14, further comprising:
determining the object acquisition includes a new coverage plan; and
storing data indicative of the object acquisition, the new coverage plan, and the characteristic of the object acquisition in the at least one category.

19. The computer-implemented method of claim 14, wherein prior to transmitting the notification, the method further comprises:
determining whether the coverage plan for the corresponding object acquisition has expired; and
transmitting the notification in response to determining the coverage plan has not expired.

20. A system for facilitating identification of existing protection for prior object acquisitions, comprising:
a processor; and
a memory storing instructions that, when executed by the processor, causes the processor to perform operations including:
receiving data indicative of an acquisition of a first object by a user;
determining a first grouping from a plurality of groupings, for the first object, the first grouping based on one or more purchase characteristics of the first object or one or more purchase characteristics of one or more other objects of the first grouping;

identifying a matching object acquisition from the first grouping based on the one or more purchase characteristics of the first object and the matching object;

determining the matching object acquisition includes object coverage protection; and transmitting an alert to a user device of the matching object acquisition and the object coverage protection.

* * * * *